(12) United States Patent
Jones et al.

(10) Patent No.: US 10,900,593 B2
(45) Date of Patent: Jan. 26, 2021

(54) RETAINING DEVICE FOR A FLEXIBLE LINE

(71) Applicant: UNIVERSITY OF CENTRAL LANCASHIRE, Preston (GB)

(72) Inventors: Martin J. Jones, Lancashire (GB); Andrew Micklethwaite, Lancashire (GB)

(73) Assignee: University of Central Lancashire, Preston (GB)

( * ) Notice: Subject to any disclaimer, the term of this patent is extended or adjusted under 35 U.S.C. 154(b) by 0 days.

(21) Appl. No.: 16/321,136

(22) PCT Filed: Jul. 27, 2017

(86) PCT No.: PCT/GB2017/052197
§ 371 (c)(1),
(2) Date: Jan. 28, 2019

(87) PCT Pub. No.: WO2018/020256
PCT Pub. Date: Feb. 1, 2018

(65) Prior Publication Data
US 2019/0178418 A1    Jun. 13, 2019

(30) Foreign Application Priority Data

Jul. 29, 2016    (GB) .................................. 1613146.8

(51) Int. Cl.
*F16B 2/20*    (2006.01)
*F16L 3/12*    (2006.01)
(Continued)

(52) U.S. Cl.
CPC .......... *F16L 3/1226* (2013.01); *H02G 3/0456* (2013.01); *H02G 3/32* (2013.01);
(Continued)

(58) Field of Classification Search
CPC .... Y10T 24/3998; Y10T 24/3922; F16B 2/02; F16B 2/20; F16B 2/10; F16B 2/246
(Continued)

(56) References Cited

U.S. PATENT DOCUMENTS 6,392,149 B1 *   5/2002   Kim ..................... H05K 7/1491
                                                                    174/70 R
6,417,452 B1 *   7/2002   Doshita ............... B60R 16/0215
                                                                    174/135

(Continued)

FOREIGN PATENT DOCUMENTS

CH              700947         11/2010
EP           2216575 A1         8/2010
(Continued)

OTHER PUBLICATIONS

International Search Report and Written Opinion, European Patent Office, PCT/GB2017/052197, dated Oct. 9, 2017, 14 pages.
(Continued)

*Primary Examiner* — Alfred J Wujciak
(74) *Attorney, Agent, or Firm* — Taft Stettinius & Hollister LLP; Stephen F. Rost

(57) ABSTRACT

A retaining device for a flexible line, comprising a first member (100), a second member (200) moveably attachable to the first member, and a guiding means (110, 210) positioned on either or both of the first member (100) and the second member (200). The first member has a first retaining portion (400) positioned on a first retaining surface (100a) of the first member. The second member has a second retaining portion (400) positioned on a second retaining surface (200a) of the second member. The first retaining portion and the second retaining portion are each configured to retain a flexible line, and the guiding means (110, 210) is configured to determine the curvature of the flexible line to inhibit kinking of the flexible line when retained by the first (Continued)

retaining portion (400) and the second retaining portion (400).

15 Claims, 3 Drawing Sheets

(51) Int. Cl.
*H02G 3/32* (2006.01)
*H02G 3/04* (2006.01)
*F16B 2/02* (2006.01)
*F16B 2/24* (2006.01)
*F16B 2/10* (2006.01)

(52) U.S. Cl.
CPC . *F16B 2/02* (2013.01); *F16B 2/10* (2013.01); *F16B 2/20* (2013.01); *F16B 2/246* (2013.01); *H02G 3/0475* (2013.01); *H02G 3/0481* (2013.01)

(58) Field of Classification Search
USPC ......... 248/63, 65, 67.7, 68.1, 70, 74.1, 74.2, 248/231.71, 231.81, 230.6, 230.7, 316.1, 248/316.7; 174/41, 40 CC, 480, 72 A, 174/135, 95, 99 R, 97, 71 R, 650, 652, 174/653, 654, 655, 660
See application file for complete search history.

(56) References Cited

U.S. PATENT DOCUMENTS

| | | | |
|---|---|---|---|
| 7,473,846 B2* | 1/2009 | Doerr | H05K 7/1491 174/68.3 |
| 8,166,617 B2* | 5/2012 | Yan | A61M 5/1418 24/132 R |
| 8,789,799 B2* | 7/2014 | Aninger | A47L 15/4257 248/68.1 |
| 10,420,247 B2* | 9/2019 | Chen | H05K 7/1491 |
| 2004/0216911 A1* | 11/2004 | Franz | H02B 1/202 174/72 A |
| 2007/0090231 A1 | 4/2007 | Macduff | |
| 2008/0035799 A1 | 2/2008 | Yamamoto | |

FOREIGN PATENT DOCUMENTS

| | | | | |
|---|---|---|---|---|
| FR | 2247936 A7 | | 5/1975 | |
| GB | 2510875 A | * | 8/2014 | ........... H02G 3/0431 |
| GB | 2510875 A | | 8/2014 | |

OTHER PUBLICATIONS

U.K. Search Report, U.K. Intellectual Property Office, GB1613145.8, dated Jan. 24, 2017, 3 pages.

* cited by examiner

RETAINING DEVICE FOR A FLEXIBLE LINE

This application is, a national stage application under 35 U.S.C. § 371 of PCT International Application Serial No. PCT/GB2017/052197, which has an international filing date of Jul. 27, 2017, designates the United States of America, and claims the benefit of GB Application No 1613146.8, which was filed on Jul. 29, 2016, the disclosures of which are hereby expressly incorporated by reference in their entirety.

This invention relates to a retaining device for determining the curvature of a flexible line.

BACKGROUND

Cable management and management of flexible lines or tubing is an everyday need in a wide variety of industries including IT, clinical and construction, as well as in domestic use. If cables or flexible lines are left unmanaged such that they are strewn across a floor within a house or a hospital, they may constitute a safety hazard. An unmanaged cable or line may be a tripping hazard, an electrical hazard, or, if the line carries a fluid, the fluid flow may become constricted or blocked if the line becomes obstructed. Typically, a device may be used to attach a line to a surface (e.g. a wall), wherein a base of the device is attached to the surface, and then the device retains the line adjacent to the surface. An angled device may be used to retain the line adjacent to a wall having a specific angled corner. When the line carries a fluid, the line may kink if the corner is sufficiently acute to cause kinking, which may undesirably constrict or block fluid flow through the line. A separate angled device may be required for differently angled corners, e.g. one device may be configured to manage a line around a corner whereas a separate device may be configured to manage a line along a straight wall. Also, prior art devices are typically configured to retain a line of a specific cross sectional size. Thus, to manage flexible lines, a user may be required to stock a wide variety of devices configured for differently angled corners and differently sized flexible line.

It is an object of certain embodiments of the present invention to address some of the above described disadvantages associated with the prior art.

BRIEF SUMMARY OF THE DISCLOSURE

According to a first aspect of the present invention, there is provided a retaining device for a flexible line, comprising:

a first member having a first retaining portion positioned on a first retaining surface of the first member;

a second member having a second retaining portion positioned on a second retaining surface of the second member, the second member being moveably attachable to the first member; and a guiding means positioned on either or both of the first member and the second member;

wherein the first retaining portion and the second retaining portion are each configured to retain a flexible line, and wherein the guiding means is configured to determine the curvature of the flexible line to inhibit kinking of the flexible line when retained by the first retaining portion and the second retaining portion.

In certain embodiments, in a first configuration, the first member may be in a first position relative to a second position such that a convex junction is formed between the first retaining surface and the second retaining surface, and the guiding means is configured to determine the curvature of the flexible line to be convex whereby, when the flexible line is retained, the first retaining surface and second retaining surface are radially inward of the curvature of the flexible line. The guiding means may include a first guide surface configured to determine the curvature of the flexible line to be convex when retained by the retaining device in the first configuration. The first guide surface may comprise a convex surface.

In certain embodiments, in a second configuration, the first member may be in a second position relative to the second member such that a concave junction is formed between the first retaining surface and the second retaining surface, and the guiding means is configured to determine the curvature of the flexible line to be concave whereby, when the flexible is retained, the first retaining surface and second retaining surface are radially outward of the curvature of the flexible line. The guiding means may include a second guide surface configured to determine the curvature of the flexible line to be concave when retained by the retaining device in the second configuration. The second guide surface may comprise a concave surface.

In certain embodiments, in a third configuration, the first member may be in a third position relative to the second member such that the first member and the second member form a substantially straight junction, and the guiding means is configured to permit the flexible line to be substantially straight when retained by the retaining device.

In certain embodiments, the guiding means may include at least one sidewall configured to limit movement of the flexible line when retained. The sidewall may be substantially orthogonal to the first retaining surface of the second retaining surface.

In certain embodiments, the second member may be hingedly attachable to the first member. The second member may be attached to the first member via a living hinge. In certain embodiments, the whole retaining device may be formed as a single component. In certain embodiments, the first member, the second member and the living hinge may be formed as a single component (i.e. are integrally formed with one another).

In certain embodiments, the retaining device may comprise limiting means configured to limit the angle of the first member relative to the second member. The guiding means may comprise the limiting means. The limiting means may comprise at least one abutment surface on the guiding means to limit the first member to a predetermined angle relative to the second member.

In certain embodiments, the retaining device may comprise holes configured to permit the retaining device to be fixed to a surface.

In certain embodiments, the retaining device may comprise attachment means configured to attach the retaining device to a surface.

In certain embodiments, the first retaining portion and the second retaining portion may each comprise a receiving portion configured to receive the flexible line. The receiving portion may be helically-shaped. The receiving portion may comprise a flexible material.

According to a second aspect of the present invention, there is a provided a retaining kit comprising a plurality of the retaining device according to any embodiment of the first aspect of the present invention.

BRIEF DESCRIPTION OF THE DRAWINGS

Embodiments of the invention are further described hereinafter with reference to the accompanying drawings, in which.

DETAILED DESCRIPTION

Figure 1:
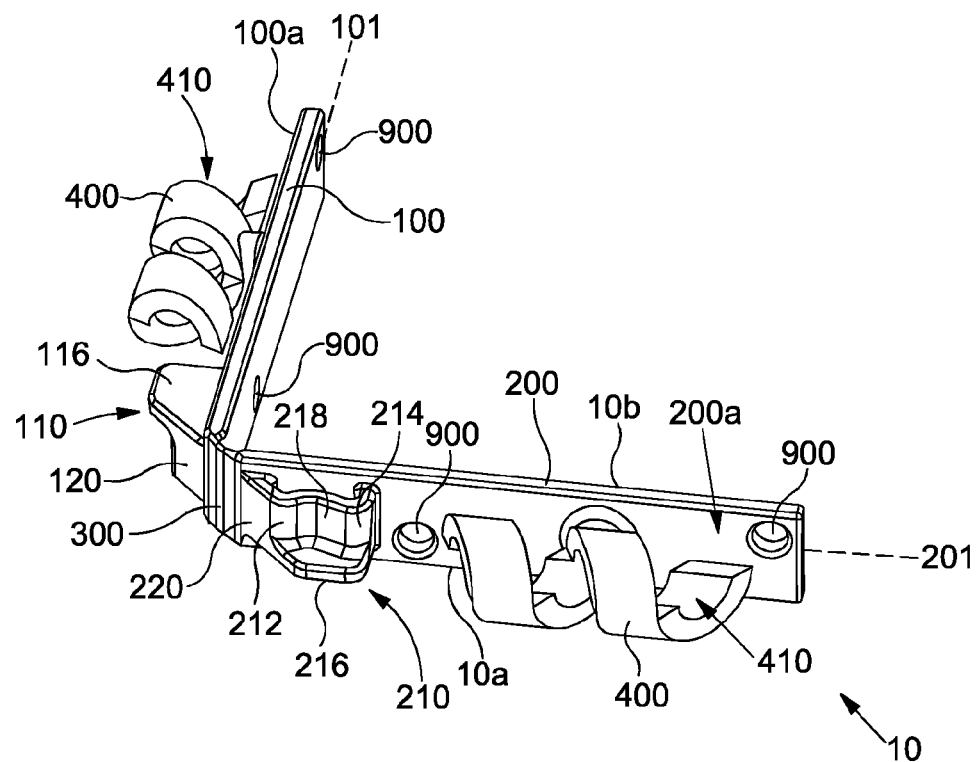
FIG. 1 is a perspective view of a retaining device according to an embodiment of the present invention.
Figure 5:
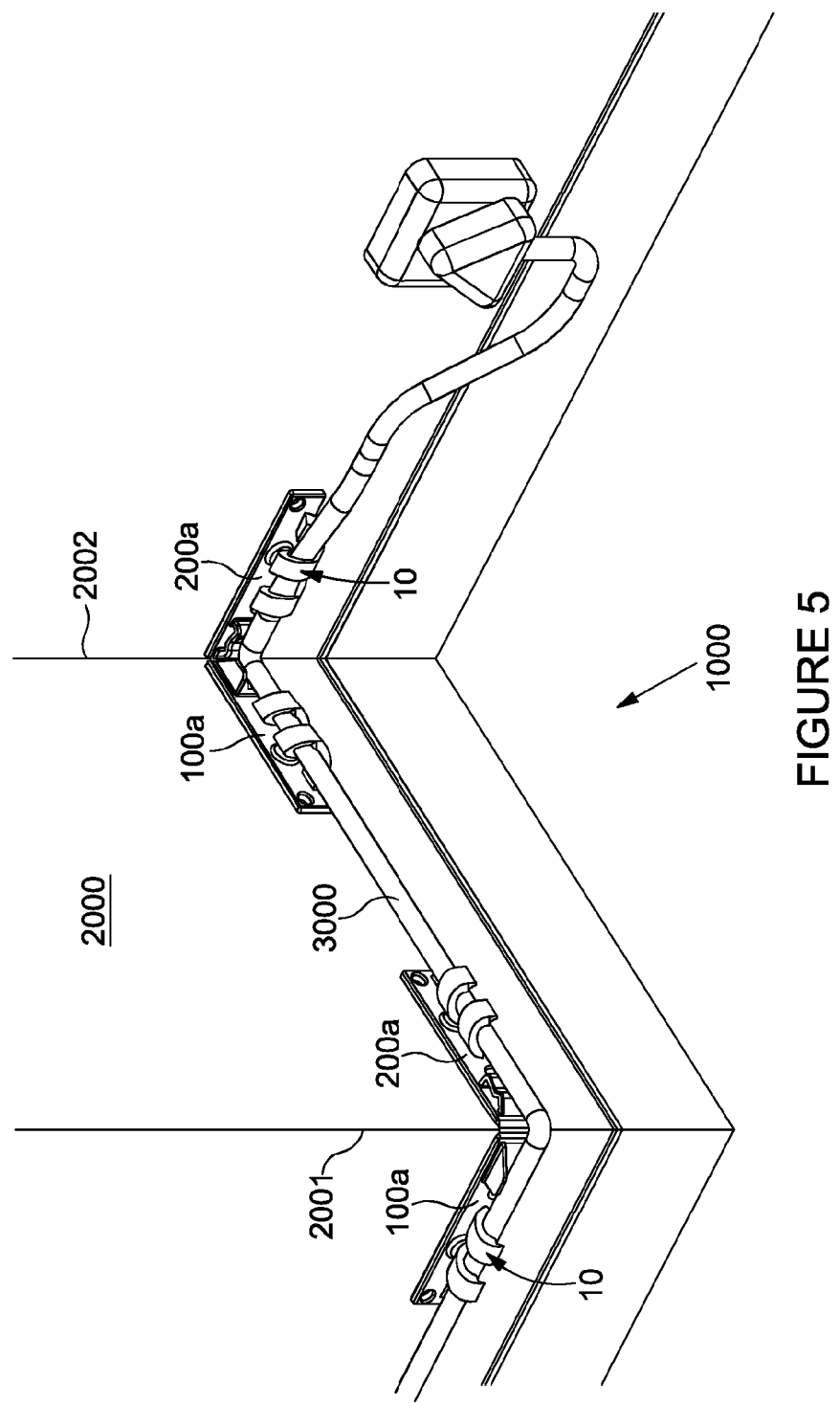
FIG. 5 is a perspective view of a flexible line retaining kit according to an embodiment of the present invention.

A retaining device 10 in accordance with an embodiment of the present invention is shown in FIG. 1. The retaining device 10 is for retaining and determining the curvature of a flexible line (an example of which is shown in FIG. 5). The flexible line is considered to be any line, cable or tube which is capable of bending, e.g. an electrical cable or a hose pipe.

The retaining device 10 includes a first member 100 having a first retaining surface 100a and a second member 200 having a second retaining surface 200a. The second member 200 is moveably attached to the first member 100 via a living hinge 300. That is, the first member 100, the second member 200 and the living hinge 300 may be formed as a single component (i.e. are integrally formed with one another). The first member 100 and the second member 200 each include a retaining portion 400 extending from the first retaining surface 100a and the second retaining surface 200a respectively. The retaining portion 400 is configured to receive and retain the flexible line (not shown). The retaining device 10 further includes a guiding means configured to determine the curvature of the flexible line when retained by the retaining portion 400 of the first retaining member 100 and the second retaining member 200. The guiding means is in the form of a first guide member 110 positioned on the first member 100 and extending from the first retaining surface 100a, and a second guide member 210 positioned on the second member 200 and extending from the second retaining surface 200a. In other embodiments, the guiding means may be any guide suitable for determining the curvature of the flexible line when retained by the retaining portions 400.

FIG. 1 shows the retaining device 10 in a first, or convex, configuration wherein the first member 100 is in a first position relative to the second member 200 such that a convex junction is formed between the first retaining surface 100a and the second retaining surface 200a. The convex junction is defined by an angle between the first retaining surface 100a and the second retaining surface 200a being greater than 180 degrees. In use, the first retaining surface 100a and the second retaining surface 200a may be radially inward of a curve formed by the flexible line when the flexible line is retained by the retaining device 10.

Figure 2:
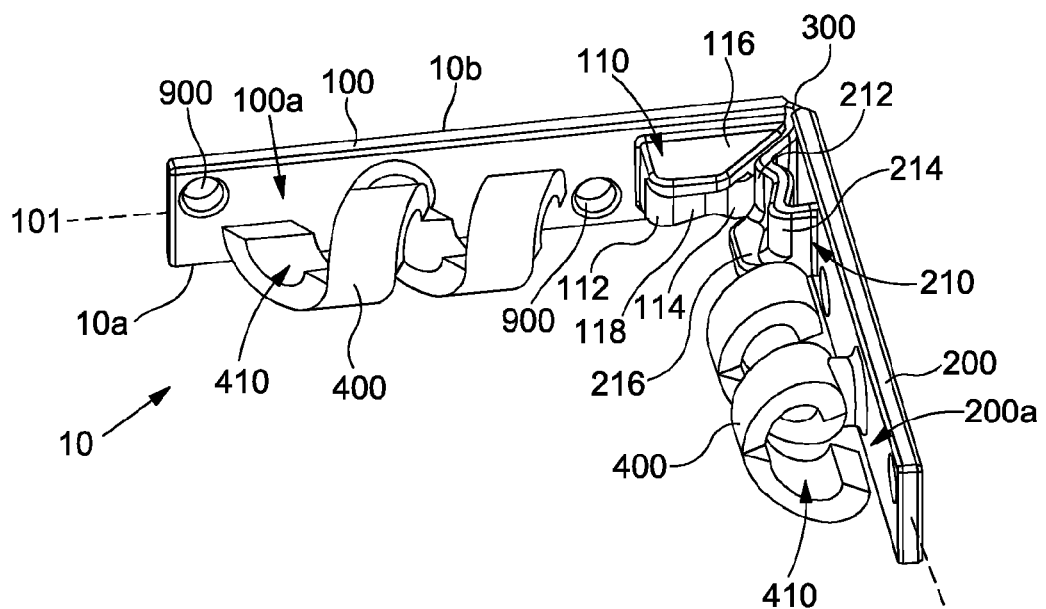
FIG. 2 is a perspective view of the retaining device of FIG. 1 in a concave configuration.
Figure 3:
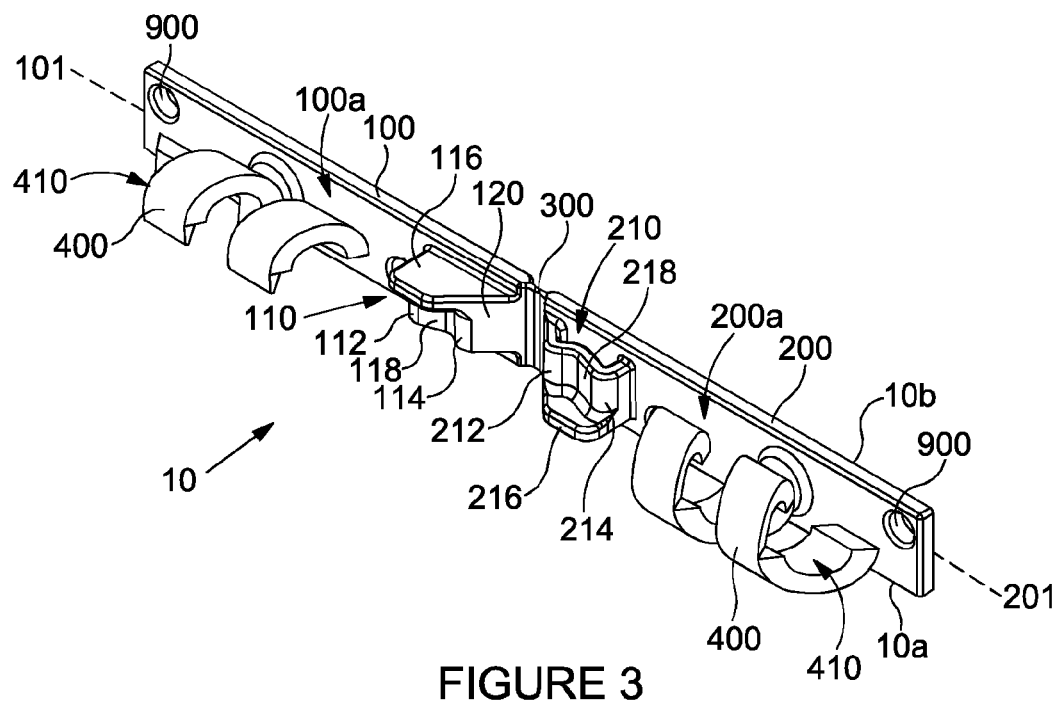
FIG. 3 is a perspective view of the retaining device of FIG. 1 in a straight configuration.

The first guide member 110 includes a first convex surface 112 (as shown in FIGS. 2 and 3) configured to provide a first contact point for the flexible line, and a second convex surface 114 configured to provide a second contact point 114a for the flexible line. The second guide member 210 includes a third convex surface 212 configured to provide a third contact point for the flexible line, and a fourth convex surface 214 configured to provide a fourth contact point for the flexible line. In the convex configuration as shown in FIG. 1, when the flexible line is retained by the retaining portions 400, the curvature of the flexible line may be determined between the retaining portions 400 by respective contact points of the first convex surface 112, the second convex surface 114, the third convex surface 212 and the fourth convex surface 214. In certain examples, the curvature of the flexible line may be determined by the respective contact points of either the first convex surface 112 or second convex surface 114, and either the third convex surface 212 or the fourth convex surface 214.

In alternative embodiments, each of the first guide member 110 and second guide member 210 may include one or more convex or other suitable surfaces configured to provide a contact point for the flexible line so long as, when the flexible line is retained in the convex configuration, the flexible line has a radius of curvature such to inhibit kinking.

The first guide member 110 further includes a first sidewall 116 orthogonal to the first retaining surface 100a and proximal to a first side 10a of the retaining device 10. The first sidewall 116 is configured to limit movement of the flexible line in a direction parallel to the first retaining surface 100a and orthogonal to a longitudinal direction of the flexible line. The second guide member 210 further includes a second sidewall 216 orthogonal to the second retaining surface 210a and proximal to a second side 10b of the retaining device 10, wherein the first retaining surface 100a and the second retaining surface 200a each extend between the first side 10a and the second side 10b of the retaining device 10. The second sidewall 216 is configured to limit movement of the flexible line in a direction parallel to the second retaining surface 210a and orthogonal to a longitudinal direction of the flexible line.

In alternative embodiments, each of the first guide member 110 and the second guide member 210 may comprise none, one, or more sidewalls proximal to either or both of the first side 10a and the second side 10b of the retaining device, so long as the sidewalls are configured to limit movement of the flexible line in a direction parallel to the first retaining surface 100a and the second retaining surface 200a respectively and orthogonal to a longitudinal direction of the flexible line. In certain embodiments, the sidewall may extend from the retaining surface in a non-orthogonal manner so long as the sidewall is configured to limit movement of the flexible line when the flexible line is retained.

As the first guide member 110 and the second guide member 210 extend from the first retaining surface 100a and the second retaining surface 200a respectively, when retained in the convex configuration, the radius of curvature of a flexible line between the retaining portions 400 is greater than if the first guide member 110 and the second guide member 210 did not extend from their respective retaining surfaces 100a, 200a. Such an increase in the radius of curvature advantageously reduces the likelihood of, i.e. inhibits, kinking of the flexible line when retained by the retaining device 10 in the convex configuration. Reducing the likelihood of kinking of the flexible line is particularly critical for flexible lines carrying fluids, as kinking may block flow of fluid within the flexible line.

FIG. 5 shows an example use of the retaining device 10 in the convex configuration, wherein the retaining device 10 may be used to guide an electrical cable 3000 around a wall 2000 having a convex corner 2001. The convex corner 2001 is such that adjacent surfaces either side of the convex corner are angled greater than 180 degrees relative to each other. The first retaining surface 100a and the second retaining surface 200a are radially inward of the curvature of the electrical cable 3000. The radius of curvature of the electrical cable 3000 determined by the retaining device 10 in the convex configuration advantageously reduces the likelihood of kinking of the electrical cable 3000 about the convex corner 2001.

FIG. 2 shows the retaining device 100 in a second, or concave, configuration wherein the first member 100 is in a second position relative to the second member 200 such that a concave junction is formed between the first retaining surface 100a and the second retaining surface 200a. The concave junction is defined by the angle between the first retaining surface 100a and the second retaining surface 200a being less than 180 degrees. In use, the first retaining surface 100a and the second retaining surface 200a may be radially outward of the curvature of the flexible line when the flexible line is retained by the retaining device 10.

The first guide member 110 includes a first concave surface 118 (as shown in FIGS. 2 and 3), and the second guide member 210 includes a second concave surface 218. The first concave surface 118 is configured to curve the flexible line away from the first retaining surface 100a of the first member 100. The first concave surface 118 is shaped such that, along a plane parallel to a longitudinal axis 101 of the first member 100 and orthogonal to the first retaining surface 100a, the first concave surface 118 curves towards the first retaining surface 100a and then away from the first retaining surface 100a. The second concave surface 218 is configured to curve the flexible line away from the second retaining surface 200a of the second member 200. The second concave surface 218 is shaped such that, along a plane parallel to a longitudinal axis 201 of the first member 200 and orthogonal to the second retaining surface 200a, the second concave surface 218 curves towards the second retaining surface 200a and then away from the second retaining surface 200a. In the concave configuration, when the flexible line is received by the receiving portions 400, the curvature of the flexible line is determined by the first concave surface 118 and the second concave surface 218.

The first concave surface 118 and second concave surface 218 are configured to curve the flexible line with a greater radius of curvature than if the concave surfaces 118, 218 were not present. Such an increase in the radius of curvature advantageously reduces the likelihood of, i.e. inhibits, kinking of the flexible line when retained by the retaining device 10 in the concave configuration. Reducing the likelihood of kinking of the flexible line is particularly critical for flexible lines carrying fluids, as kinking may block flow of fluid within the flexible line.

In alternative embodiments, each of the first guide member 110 and the second guide member 210 may comprise one or more concave or other suitable surfaces so long as, when the flexible line is retained in the concave configuration, the flexible line has a radius of curvature that inhibits kinking.

The first guide member 110 further comprises a first abutment surface 120, and the second guide member 210 further comprises a second abutment surface 220, as clearly shown in FIG. 1. The first abutment surface 120 is configured to abut the second abutment surface 220 to prevent the angle between the first retaining surface 100a and the second retaining surface 200a from being acute (less than 90 deg) such to advantageously reduce the likelihood of kinking of the flexible line when the flexible line is retained by the retaining device 10. FIG. 2 clearly shows the first abutment surface 120 abutting the second abutment surface 220 when the retaining device 10 is in the concave configuration.

In alternative embodiments, either the first guide member 110 or the second guide member 210 may comprise an abutment surface. In other embodiments, the retaining device 10 may comprise any suitable means for limiting the angle between the first member 100 and the second member 200 such to reduce the likelihood of kinking of the flexible line when the flexible line is retained by the retaining device 10.

FIG. 5 shows an example use of the retaining device 10 in the concave configuration, wherein the retaining device 10 may be used to guide the electrical cable 3000 around a concave corner 2002 of the wall 2000. The concave corner 2002 is such that adjacent surfaces either side of the concave corner 2002 are angled less than 180 degrees relative to each other. The first retaining surface 100a and the second retaining surface 200a are radially outward of the curvature of the electrical cable 3000. The radius of curvature of the electrical cable 3000 determined by the retaining device 10 in the concave configuration, and the angle between the first retaining surface 100a and the second retaining surface 200a being limited by the abutment surfaces 120, 220, may advantageously reduce the likelihood of kinking of the electrical cable 3000 within the concave corner 2002.

Figure 4:
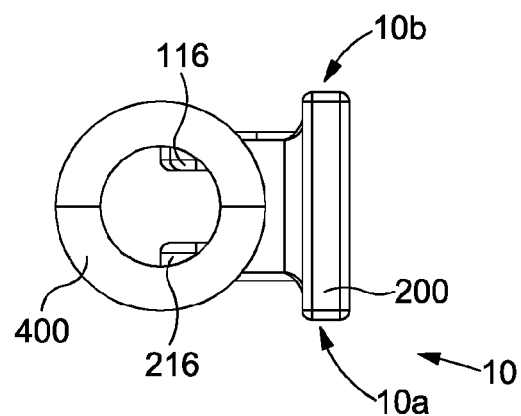
FIG. 4 is an end view of the retaining device of FIG. 3.

FIG. 3 shows the retaining device 10 in a third, or straight, configuration wherein the first member 100 is in a third position relative to the second member 200 such that a substantially straight junction is formed between the first retaining surface 100a and the second retaining surface 200a. The longitudinal axis 101 of the first member 100 is substantially aligned with the longitudinal axis 201 of the second member 200. When the flexible line is retained in the straight configuration, the flexible line remains substantially straight between the retaining portions 400. That is to say, the first guide member 110 and the second guide member 210 permit the flexible line to remain straight between the retaining portions 400. FIG. 4 shows an end view of the retaining device 10 in the straight configuration, wherein a clear line of sight exists throughout the retaining device 10 such that the flexible line may pass through both retaining portions 400 whilst remaining substantially straight.

The living hinge 300 permits the retaining device 10 to move between the convex configuration shown in FIG. 1, the concave configuration shown in FIG. 2, and the straight configuration shown in FIG. 3. By being able to move between different configurations, the retaining device 10 may advantageously be used to retain a flexible line adjacent to a convex, concave or straight surface. Further, the retaining device 10 may advantageously reduce the likelihood of the flexible line kinking in both the convex and concave configurations. Thus, one retaining device 10 is suitable for convex, concave and straight configurations, and a user whom requires to retain a flexible line against a surface may advantageously only need to stock retaining devices according to embodiments of the present invention, rather than stock a variety of different devices suited to different configurations.

In alternative embodiments, the first member 100 may be hingedly attached to the second member 200 by other means to permit movement between the convex, concave and straight configurations. In other embodiments, the first member 100 may be moveably attached to second member 100 such that, when the flexible line is retained, the curvature of the flexible line is determined by the first guide member 110 and the second guide member 210 to inhibit kinking of the flexible line.

In the embodiment shown in FIGS. 1 to 4, the retaining portion 400 is helically-shaped and comprises a flexible material. The retaining portion 400 may retain the flexible line such to permit longitudinal movement and restrict radial movement of the flexible line. Due to the retaining portion 400 comprising the flexible material, in use, the retaining portion 400 may receive the flexible line having a cross-sectional area greater than, smaller than or equal to a cross-sectional area of a longitudinal hole 410 of the retaining portion 400. The retaining portion 400 may deform to increase the cross-sectional area of the hole 410 such to receive and retain a flexible line having a cross-sectional area greater than or equal to the cross-sectional area of the longitudinal hole 410 when in a pre-deformed state.

Thus, the retaining portion 400 may advantageously receive and retain flexible lines of differing cross-sectional areas. A user may therefore need only one retaining device 10 for use with a number of different cross-sectional area flexible lines. Indeed, multiple flexible lines may be retained within the retaining portion 400.

In an alternative embodiment, the retaining portion may retain the flexible line such that it is fixed to the retaining portion.

In other embodiments, the retaining portion may comprise any means suitable for receiving the flexible line such to retain the flexible line within the retaining portion. For example, the retaining portion may be cylindrically-shaped or comprise one or more clips or clamps.

In other embodiments, the retaining portion may comprise any means suitable for retaining the flexible line. For example, the retaining portion may comprise an adhesive pad.

In other embodiments, the retaining portion may comprise any material suitable for retaining the flexible line. For example, the retaining portion may be a flexible or rigid metal or polymer.

In other embodiments, the first member may comprise the retaining portion according to certain embodiments of the invention, and the second member may comprise the retaining portion according to a different embodiment of the invention than the retaining portion of the first member.

In the embodiment shown in FIGS. 1 to 4, the retaining device 10 further comprises four fixing holes 900 configured to permit the retaining device 100 to be fixed to a surface, e.g. a wall. For example, the retaining device 100 may be screwed or nailed to a wall via the fixing holes 900. In an alternative embodiment, the retaining device 10 may comprise fewer than or more than four fixing holes.

In an alternative embodiment, the retaining device may be attached to a surface by any means suitable, for example the retaining device may be glued to a surface, or adhesive pads may be used to attach the retaining device to a surface.

In certain embodiments, the first member 110 and the second member 210 may comprise a flexible material such that they may be attached to a curved surface.

A retaining kit 1000 according to an embodiment of the present invention is shown in FIG. 5. The retaining kit 1000 comprises two of the retaining device 10 according to an embodiment of the present invention. The retaining kit 1000 is configured to guide the electrical cable 3000 around a wall 2000 having a convex corner 2001 and a concave corner 2002. One retaining device 10 in the convex configuration is configured to guide the electrical cable 3000 around the convex corner 2001. The other retaining device 10 in the concave configuration is configured to guide the electrical cable 3000 around the concave corner 2002. In other embodiments, the retaining kit may comprise any number of the retaining device according to the present invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A retaining device for a flexible line, comprising:
a first member having a first retaining portion positioned on a first retaining surface of the first member;
a second member having a second retaining portion positioned on a second retaining surface of the second member, the second member being moveably attachable to the first member; and
a guiding means positioned on both of the first member and the second member;
each guiding means includes a first convex surface configured to provide a first contact point for the flexible line, a second convex surface configured to provide a second contact point for the flexible line, and a concave surface configured to curve the flexible line away from the respective first or second retaining surface of the first or second member;
wherein the first retaining portion and the second retaining portion are each configured to retain the flexible line,
wherein in a convex configuration adapted to mount on corner of a wall the first member is in a first position relative to the second member such that a convex junction is formed between the first retaining surface and the second retaining surface, and the guiding means is configured to determine the curvature of the flexible line to be convex whereby, when the flexible line is retained, the first retaining surface and the second retaining surface are radially inward of the curvature of the flexible line;
wherein in a concave configuration adapted to mount on corner of the wall the first member is in a second position relative to the second member such that a concave junction is formed between the first retaining surface and the second retaining surface, and the guiding means is configured to determine the curvature of the flexible line to be concave whereby, when the flexible line is retained, the first retaining surface and the second retaining surface are radially outward of the curvature of the flexible line; and wherein the guiding means is configured to determine the curvature of the flexible line to inhibit kinking of the flexible line when retained by the first retaining portion and the second retaining portion.

2. A retaining device according to claim 1, wherein in a straight configuration, the first member is in a third position relative to the second member such that the first member and the second member form a substantially straight junction, and the guiding means is configured to permit the flexible line to be substantially straight when retained by the retaining device.

3. A retaining device according to claim 1, wherein the guiding means includes at least one sidewall configured to limit movement of the flexible line when retained.

4. A retaining device according to claim 3, wherein the sidewall is substantially orthogonal to the first retaining surface or the second retaining surface.

5. A retaining device according to claim 1, wherein the second member is hingedly attachable to the first member.

6. A retaining device according to claim 5, wherein the second member is attached to the first member via a living hinge and/or the retaining device is formed as a single component.

7. A retaining device according to claim 1, further comprising limiting means configured to limit the angle of the first member relative to the second member.

8. A retaining device according to claim 7, wherein the guiding means comprises the limiting means.

9. A retaining device according to claim 8, wherein the limiting means comprises at least one abutment surface on the guiding means to limit the first member to a predetermined angle relative to the second member.

10. A retaining device according to claim 1, further comprising holes configured to permit the retaining device to be fixed to a surface.

11. A retaining device according to claim 1, further comprising attachment means configured to attach the retaining device to a surface.

12. A retaining device according to claim 1, wherein the first retaining portion and the second retaining portion each comprise a receiving portion configured to receive the flexible line.

13. A retaining device according to claim 12, wherein the receiving portion is helically-shaped.

14. A retaining device according to claim 12, wherein the receiving portion comprises a flexible material.

15. A retaining kit comprising a plurality of retaining devices where each of the plurality of retaining device comprises:
    a first member having a first retaining portion positioned on a first retaining surface of the first member;
    a second member having a second retaining portion positioned on a second retaining surface of the second member, the second member being moveably attachable to the first member; and
    a guiding means positioned on both of the first member and the second member;
    each guiding means includes a first convex surface configured to provide a first contact point for the flexible line, a second convex surface configured to provide a second contact point for the flexible line, and a concave surface configured to curve the flexible line away from the respective first or second retaining surface of the first or second member;
    wherein the first retaining portion and the second retaining portion are each configured to retain a flexible line,
    wherein in a convex configuration adapted to mount on corner of a wall the first member is in a first position relative to the second member such that a convex junction is formed between the first retaining surface and the second retaining surface, and the guiding means is configured to determine the curvature of the flexible line to be convex whereby, when the flexible line is retained, the first retaining surface and the second retaining surface are radially inward of the curvature of the flexible line;
    wherein in a concave configuration adapted to mount on corner of the wall the first member is in a second position relative to the second member such that a concave junction is formed between the first retaining surface and the second retaining surface, and the guiding means is configured to determine the curvature of the flexible line to be concave whereby, when the flexible line is retained, the first retaining surface and the second retaining surface are radially outward of the curvature of the flexible line; and
    wherein the guiding means is configured to determine the curvature of the flexible line to inhibit kinking of the flexible line when retained by the first retaining portion and the second retaining portion.

* * * * *